US012109544B2

(12) United States Patent
Suman

(10) Patent No.: US 12,109,544 B2
(45) Date of Patent: Oct. 8, 2024

(54) VENTURI AIR-AMMONIA MIXER ENABLED FOR TWO BURNER SYSTEM

(71) Applicant: DEEPAK NITRITE LIMITED, Gujarat (IN)

(72) Inventor: Sanjay Kumar Suman, Gujarat (IN)

(73) Assignee: DEEPAK NITRITE LIMITED, Vadodara (IN)

( * ) Notice: Subject to any disclaimer, the term of this patent is extended or adjusted under 35 U.S.C. 154(b) by 537 days.

(21) Appl. No.: 17/613,489

(22) PCT Filed: Mar. 9, 2020

(86) PCT No.: PCT/IB2020/052017
§ 371 (c)(1),
(2) Date: Nov. 22, 2021

(87) PCT Pub. No.: WO2021/099846
PCT Pub. Date: May 27, 2021

(65) Prior Publication Data

US 2022/0241739 A1 Aug. 4, 2022

(30) Foreign Application Priority Data

Nov. 19, 2019 (IN) ............................ 201921047080

(51) Int. Cl.
*B01F 25/312* (2022.01)
*B01F 23/10* (2022.01)
*F23D 14/62* (2006.01)

(52) U.S. Cl.
CPC ........ *B01F 25/31241* (2022.01); *B01F 23/12* (2022.01); *F23D 14/62* (2013.01); *B01F 2215/0431* (2013.01); *B01F 2215/045* (2013.01); *B01F 2215/0481* (2013.01)

(58) Field of Classification Search
CPC ........................... B01F 25/31241; F23D 14/62
See application file for complete search history.

(56) References Cited

U.S. PATENT DOCUMENTS 5,251,447 A * 10/1993 Joshi ........................ F23R 3/14 431/185
8,602,634 B2 12/2013 Matula
10,086,332 B2 10/2018 Zhang
2015/0007900 A1* 1/2015 Li .......................... F23D 14/04 137/892

FOREIGN PATENT DOCUMENTS

CN 203899474 U 10/2014

* cited by examiner

*Primary Examiner* — Lorne E Meade

(57) ABSTRACT

Disclosed is a venturi air-ammonia mixer 200 enabled for a two-burner system. The venturi air-ammonia mixer 200 comprises a venturi body 204 and an annular region 212. Further the venturi body 204 comprises a convergent section 204(*a*) comprising an air inlet feed 208 a cylindrical section 204(*b*) comprising an inner hollow member 202, and a divergent section 204(*c*) comprising an air-ammonia gas outlet 210. Further the cylindrical section 204(*b*) and the inner hollow member 202 comprises a first perforated region and a second perforated region. Further the cylindrical section 204(*b*) is enclosed in the annular region 212 and connected to an ammonia inlet feed 206. Further the ammonia inlet feed 206 fills the annular region 212 with dry ammonia gas which further flows into the venturi air-ammonia mixer 200 through the perforated regions thereby enabling uniform mixing of the ammonia gas with air from the air inlet feed 208.

11 Claims, 3 Drawing Sheets

VENTURI AIR-AMMONIA MIXER ENABLED FOR TWO BURNER SYSTEM

CROSS-REFERENCE TO RELATED APPLICATIONS AND PRIORITY

The present application claims priority from Indian patent application number 201921047080 filed on 19 Nov. 2019, incorporated herein by a reference.

TECHNICAL FIELD

The present disclosure relates to the conversion of ammonia gas into oxides of nitrogen. Specifically, the present disclosure relates to mixing of air-ammonia for the formation of sodium nitrite from oxides of nitrogen.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

At present, the synthesis method of sodium nitrite comprises steps of mixing of ammonia gas and air, oxidizing the mixture in an oxidation furnace, and cooling the steam produced by the waste heat boiler, and then absorbing the alkali solution through the absorption tower. However, the method has number of disadvantages. The mixing of air and ammonia at elevated temperatures is an explosive process. Ammonia is a compressed, corrosive gas. Generally, it is a colourless gas with a sharp irritating odour, but not a flammable gas. However, being a compressed gas, it might explode under a large energy source. Further, ammonia gas is a corrosive gas as it is fatal if inhaled. Ammonia at high temperatures decomposes to form highly flammable hydrogen and a toxic nitrogen dioxide, which is dangerous. So, to ensure safety protocols to avoid such events, proper mixer of air-ammonia is necessary. Further, in conventional air-ammonia mixers, the temperature difference between dry air and ammonia gas during mixing may result in temperature variation during the mixing process, and to avoid the temperature variation phenomenon, an additional heating unit is installed, which increases the cost of assembly.

Further, gaining a proper yield of oxides of nitrogen requires proper mixing of air and ammonia gas for oxidation process. Oxidation of air-ammonia mixture is carried out in presence of catalyst. Efficient conversion of ammonia to NOx gases using the catalyst in this process is possible only when the air-ammonia is properly mixed. Formation of NOx gases is highly dependent on the level of mixing as to maximise contact between the reactants. Also, in the existing art, large inputs in the form of steam and sodium nitrite salts are required to produce oxides of nitrogen, which is not economical as the yield produced from these large inputs is generally low.

Therefore, there is a long-felt in the art for an apparatus and method enabling increase in the yield of the oxides of the nitrogen and further selective formation of Sodium nitrite by efficient mixing of air-ammonia at constant temperature by an air-ammonia mixer.

SUMMARY

Before the present system and its components are described, it is to be understood that this disclosure is not limited to the particular system and its arrangement as described, as there can be multiple possible embodiments which are not expressly illustrated in the present disclosure. It is also to be understood that the terminology used in the description is for the purpose of describing the particular versions or embodiments only and is not intended to limit the scope of the present application. This summary is not intended to identify essential features of the claimed subject matter nor is it intended for use in detecting or limiting the scope of the claimed subject matter.

The present subject matter relates to a venturi air-ammonia mixer enabled for a two-burner system, wherein the venturi air-ammonia mixer may comprise a venturi body. Further, the venturi body may comprise a convergent section, a cylindrical section, and a divergent section, wherein the convergent section may comprise an inlet for air feed. Further, the convergent section may be further connected to the cylindrical section, wherein the cylindrical section may house an inner hollow member. Further, the cylindrical section may comprise a first perforated region, and the inner hollow member may further comprise a second perforated region. Further, the cylindrical section may be encapsulated in the annular region, wherein the annular region may be further connected to the ammonia inlet feed. Further, the ammonia inlet feed may completely fill the annular region with dry ammonia gas, wherein the dry ammonia gas may flow into the venturi mixer through the first perforated region on the cylindrical section and through the second perforation region on inner hollow member. Further, the dry air coming from the air inlet feed may be uniformly mixed with the ammonia gas from the cylindrical section and the inner perforated hollow member, to form air-ammonia mixture gas, wherein the air-ammonia mixture gas may be further transmitted to the double oxidation burner system for catalytic oxidation of ammonia gas.

BRIEF DESCRIPTION OF FIGURES

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Before the present apparatus and its components are described, it is to be understood that this disclosure is not limited to the particular apparatus and its arrangement as described, as there can be multiple possible embodiments which are not expressly illustrated in the present disclosure. It is also to be understood that the terminology used in the description is for the purpose of describing the particular versions or embodiments only and is not intended to limit the scope of the present application. This summary is not intended to identify essential features of the claimed subject matter nor is it intended for use in detecting or limiting the scope of the claimed subject matter.

Figure 1:
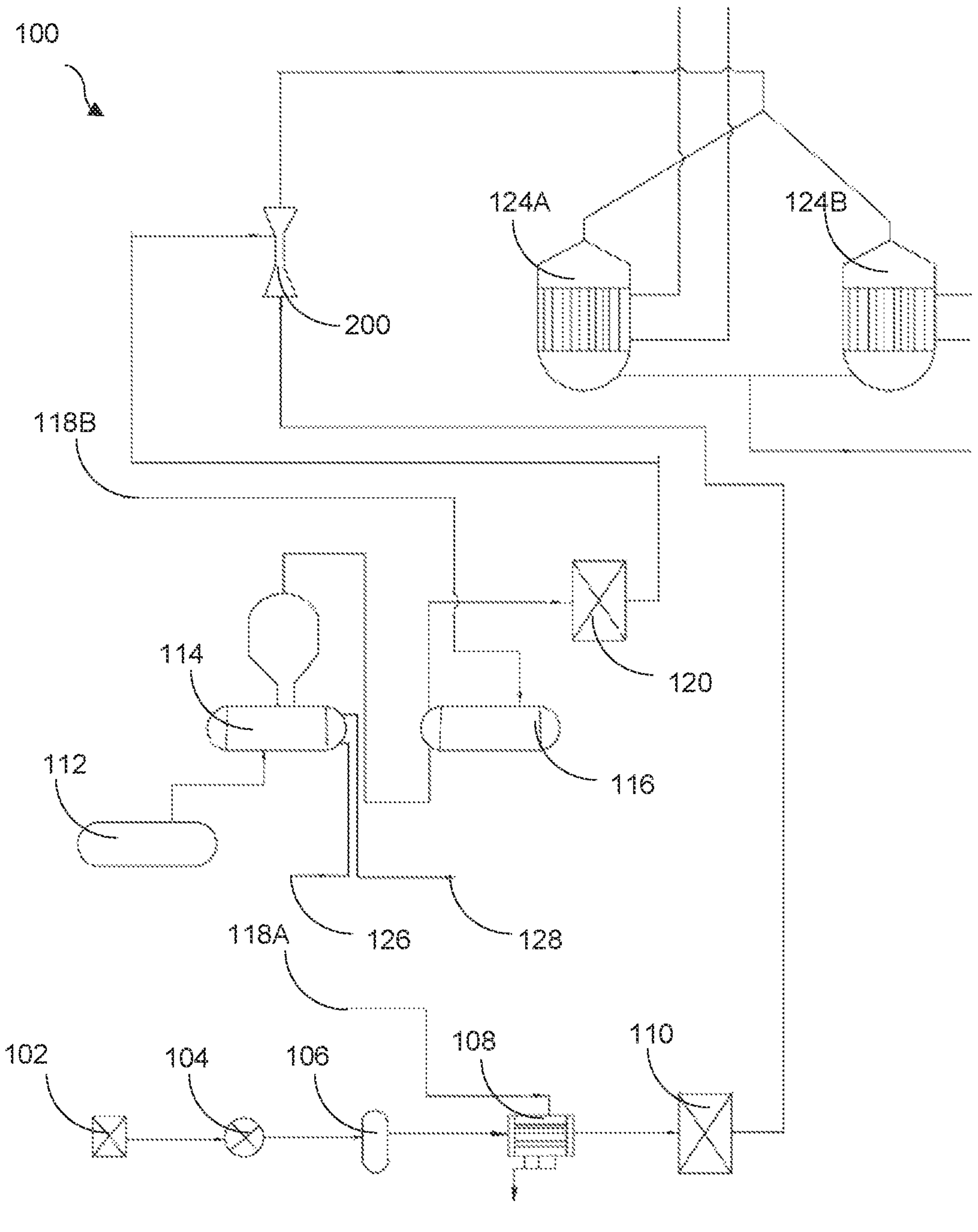
FIG. 1 illustrates the system 100 facilitating the conversion of ammonia into oxides of nitrogen, in accordance with an embodiment of the present subject matter.

Now, referring to FIG. 1, a system implemented for the oxidation of ammonia into oxides of nitrogen is illustrated, in accordance with an embodiment of the present subject matter. The system may comprise a HEPA filter 102, a rotary blower 104, an air receiver 106, and an air-preheater 108. Further, the air-preheater may comprise steam inlet 118A. Further, the system may comprise an air feed filter 110 which may supply air to the venturi air-ammonia mixer 200.

In an embodiment, the system may further comprise a liquid ammonia storage tank 112, an ammonia vaporizer 114, an ammonia superheater 116, an ammonia gas feed filter 120 which may supply ammonia gas to the venturi air-ammonia mixer 200. Further, the ammonia vaporizer comprises a chilled water supply inlet 126 (hereafter referred as CHW inlet 126) and a chilled water supply outlet 128 (hereafter referred as CHW outlet 128).

In an embodiment, the system may comprise a venturi air-ammonia mixer 200, and a double adiabatic burner 124A and 124B wherein the outlet of air-ammonia mixer is connected to the double adiabatic burner 124A and 124B assembly enabled for equal feed distribution.

In accordance with an embodiment of the present subject matter, the air may pass through the HEPA filter 102 which may filter out 97-99.7% of impurities, wherein the impurities may a have particle size in the range 0.3 to 0.5 μm in diameter. Further, the filtered air may be transferred to the air receiver 106 via the rotary blower 104. Further, the filtered air may be transferred to the air-preheater 108, wherein it may be heated using steam from the inlet 118A and transferred to the air feed filter 110, and further may be transferred to the venturi air-ammonia mixer 200. Further, the system comprises the liquid ammonia storage tank 112 wherein liquid ammonia is stored. The liquid ammonia may be transferred to the ammonia vaporizer 114 comprising the CHW inlet 126 having a CHW supply temperature range 5° C. to 7° C. and the CHW outlet 128. Liquid ammonia, which may have boiling point range −33° C. to −30° C. absorbs the latent heat from the CHW outlet 128 and may vaporize to ammonia vapors. Further, the ammonia vapors may be transferred to the ammonia superheater 116, which further comprises of steam supply 118B to heat the ammonia vapors at elevated temperatures. Further, heating of ammonia vapors at elevated temperatures may form dry ammonia gas, which may be further transferred to the venturi air-ammonia mixer 200 via the ammonia gas feed filter 120, thereafter the ammonia gas may get mixed with air.

Figure 2:
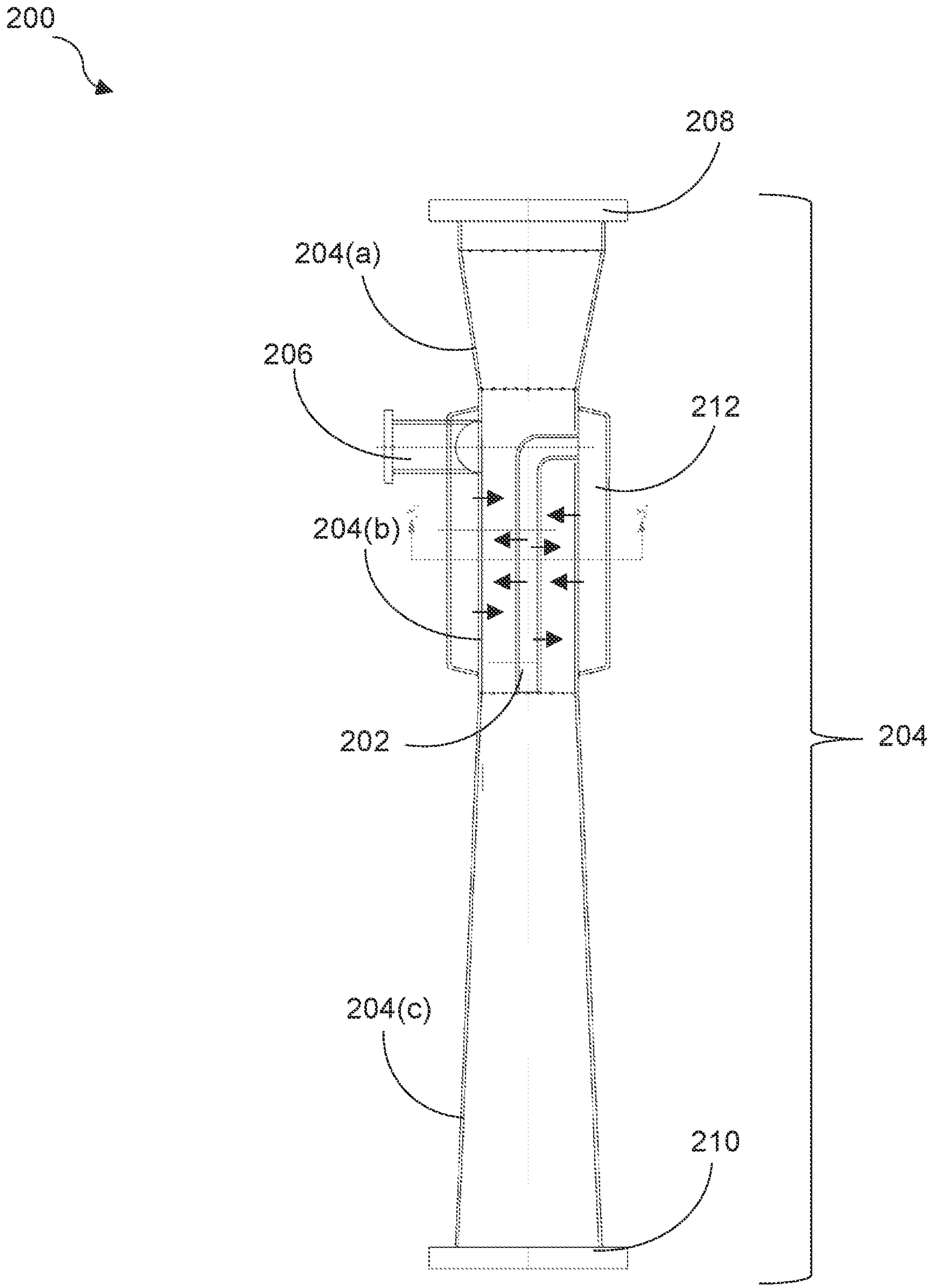
FIG. 2 illustrates a venturi type air-ammonia mixer 200 belonging to the system 100, in accordance with an embodiment of the present subject matter.

Now, referring to FIG. 2, the venturi air-ammonia mixer 200 for double adiabatic oxidation burner is illustrated, in accordance with an embodiment of the present subject matter. Further, the mixer may comprise a venturi body 204, an air inlet feed 208, an ammonia inlet feed 206, an inner hollow member 202, and an annular region 212 for storing ammonia gas. Further, the mixture of air-ammonia may be passed further to the double adiabatic burners 124A and 124B for the process of catalytic oxidation.

In one embodiment, the venturi body 204 may comprise a convergent section 204(*a*), a cylindrical section 204(*b*), and a divergent section 204(*c*). Further, the convergent section 204(*a*) may be connected to the cylindrical section 204(*b*), wherein the cylindrical section 204(*b*) may be further connected to the divergent section 204(*c*), these connections forming a venturi-shaped body (indicated as venturi body 204) for the venturi air ammonia mixer 200.

In the one embodiment, the convergent section 204(*a*) may comprise the air inlet feed 208, wherein the air inlet feed 208 may be located at the entrance of the convergent section 204(*a*). Further, the diameter of the air-inlet feed 208 may range between 250-600 mm. Further, the angle at which the convergent section is converged may range between 5°-10°. Further, the air inlet feed 208 may be configured to receive dry air from the air feed filter 110 and supply the dry air to the cylindrical section 204(*b*).

In an embodiment, the cylindrical section 204(*b*) may be enclosed in an annular region 212, wherein the annular region 212 may further be connected to the ammonia inlet feed 206. In one embodiment, the diameter of the ammonia inlet feed 206 may range between 120 mm to 180 mm. Further, the ammonia inlet feed 206 may be configured to fill the annular region 212 with ammonia gas transmitted at a velocity ranging between 16 to 25 m/s, wherein the annular region 212 may further configured to store, followed by supplying the ammonia gas to the cylindrical section 204(*b*). In one embodiment, the diameter of the cylindrical section 204(*b*) may range between 280-320 mm. In one embodiment, the circumference of the cylindrical section 204(*b*) may range between 754-1130 mm.

In one embodiment, the cylindrical section 204(*b*) further comprises the inner hollow member 202, wherein the inner hollow member 202 may be centrally located within the cylindrical section 204(*b*), and opposite to the ammonia inlet feed 206. Further, one end of the inner hollow member 202 may be further connected to the annular region 212 and the other end may be blocked. In one embodiment, the diameter of the inner hollow member 202 may range between 64-96 mm. In one embodiment, the circumference of the inner hollow member 202 may range between 200-300 mm.

Figure 4:
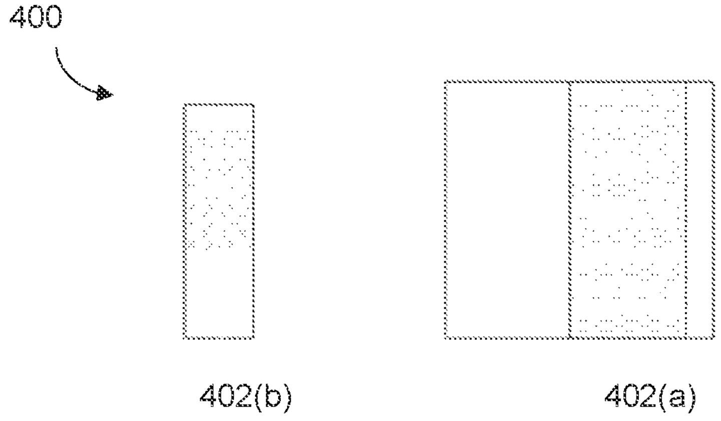
FIG. 4 illustrates a perforation regions 400 on the venturi type air-ammonia mixer 200, in accordance with an embodiment of the present subject matter.

In one embodiment, the cylindrical region 204(*b*) may be provisioned with a first perforation region 402(*a*) and the inner hollow member 202 may be further provisioned with a second perforated region 402(*b*) (refer to FIG. 4). Now, again referring to FIG. 2, the ammonia gas stored in the annular region 212 may be enabled to enter the cylindrical section 204(*b*) through the first perforation region 402(*a*), as well as through the second perforation region 402(*b*) via the inner hollow member 202. Further, the inner hollow member 202 may be configured to release ammonia gas inside the cylindrical section 204(*b*) using the second perforation region 402(*b*) thereby enabling homogeneous mixing of air and ammonia.

In an embodiment, the air from the air feed filter 110 (refer to FIG. 1) may enter the venturi air-ammonia mixer 200 through the convergent section 204(*a*). Further, the air is supplied to the venturi air-ammonia mixer 200 at a velocity ranging 39-60 m/s, preferably 49.3 m/s through the air inlet feed 208. Further, the dry ammonia gas from the annular region 212 may be supplied to the cylindrical section 204(*b*) at a velocity ranging 25-35 m/s, and at a total volumetric flow rate ranging 1060-1560 $m^3$/hour, and at operating condition having operating temperature range between 150 to 160° C. and operating pressure range between 1 to 1.5 atm through the first perforation region 402(*a*) and the second perforation region 402(*b*), and further mixes with the incoming air form the air inlet feed 208. Further, the ammonia gas supplied may comprise a density ranging between 0.46-0.69 kg/m$^3$, a viscosity ranging between 0.0012-0.0018 kg/m/s. In one embodiment, 47-72% of the total ammonia gas may be transferred to the cylindrical section 204(*b*) via the first perforation region 402(*a*) at a volumetric flow rate ranging between 0.1800-0.2600 m$^3$/s. Further, 32-48% of the total ammonia gas may be transferred to the cylindrical section 204(*b*) via the second perforation region 402(*b*) at a volumetric flow rate ranging between 0.1200-0.1800 m$^3$/s. Further, the difference in velocities and flow rates of air and ammonia gas may create a velocity head, wherein the velocity head enables the uniform mixing of air and ammonia gas.

In one embodiment, the mixture of air-ammonia mixture gas may be further transmitted to the divergent section 204(*c*), wherein the divergent section 204(*c*) comprises an outlet 210 which may supply the air-ammonia mixture gas to the other components for further processing.

Now, again referring to FIG. 1, the mixture of air-ammonia gas may be passed to the double adiabatic oxidation burners 124A and 124B. Further, the venturi air-ammonia mixer is enabled to supply an equivalent amount of air ammonia mixture feed to the double adiabatic oxidation burners 124A and 124B. Further, using double adiabatic burners 124A and 124B for oxidation process may capacitive increase yield of the oxides of nitrogen.

In another embodiment, the composition of the oxides of the nitrogen formed by oxidation of air-ammonia mixture may be passed through the absorption tower for selective production of sodium nitrite.

Figure 3:
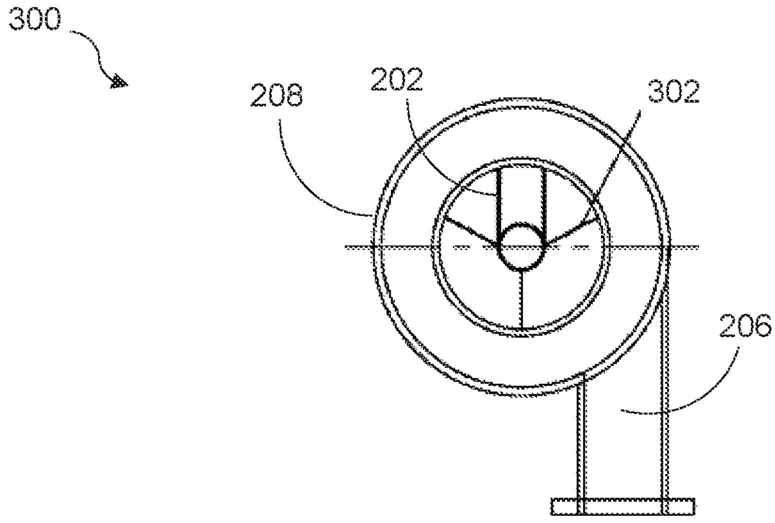
FIG. 3 illustrates the sectional X-X view of the air ammonia mixer 200, in accordance with embodiment of the present subject matter.

Now, referring to FIG. 3, a sectional view 300 of the section X-X (refer to FIG. 2) of the venturi air ammonia mixer 200 is illustrated, in accordance with embodiment of the present subject matter. Further, the inner hollow member 202 may be fixated inside the venturi air-ammonia mixer 200 using plurality of weld sections 302.

Referring to FIG. 4, the first perforation region 402(*a*) and the second perforation region 402(*b*) provisioned on the cylindrical section 204(*b*) and the inner hollow member 202 are depicted, in accordance with an embodiment of the present subject matter. In an embodiment, the length of both the first perforation region 402(*a*) and the second perforation region 402(*b*) may be within a range between 300-600 mm. In an embodiment, the area of the first perforation region 402(*a*) and the second perforation region 402(*b*) may range between 324-496 mm$^2$ and 86-130 mm$^2$ respectively. As can be seen from FIG. 4, the first perforation region 402(*a*) and the second perforation region 402(*a*) comprises an array of holes. In an embodiment, the array of holes on the first perforation region 402(*a*) may have a diameter in the range between 2-6 mm, and the pitch of the holes in the first perforated region may be 24 mm. Further, the area of individual holes in the perforated region may range between 10-30 mm$^2$. In an embodiment, the array of holes on the second perforation region 402(*b*) may have a diameter within a range of 2-6 mm, and the pitch of the holes in the second perforated region may be 15 mm. Further, the number of holes distributed circumferentially and lengthwise on the cylindrical section 204(*b*) may range between 32-48 and 16-24 respectively. Similarly, the number of holes distributed circumferentially and lengthwise on the inner hollow member 202 may range between 13-20 and 26-40 respectively. Thus, the total number of holes on the first perforation region 402(*a*) may range between 650-975, and the second perforated region 402(*b*) may range between 443-665. In one embodiment, the volumetric flow rate of ammonia through each hole of the first perforation region 402(*a*) and the second perforated region 402(*b*) may range between 0.000215-0.000325 Nm$^3$/hour. In one embodiment, the velocity of ammonia gas through each hole of the first perforation region 402(*a*) and the second perforation region 402(*b*) may range between 30-45 m/s. In one embodiment, the pressure drop during the flow of ammonia gas across each hole of the first perforation region 402(*a*) and the second perforation region 402(*b*) may range between 332-500 Pa.

The present subject matter may have the following advantages:

- Proper mixing of air and ammonia gas in a controlled atmosphere, which ensures safe process throughout.
- Proper mixing of air and ammonia gas to obtain increase yield of NOx gases.
- Proper supply of the air-ammonia mixer to both the burners to ensure an increased yield, with the input substituents and investments provided.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The foregoing description shall be interpreted as illustrative and not in any limiting sense. A person of ordinary skill in the art would understand that certain modifications could come within the scope of this disclosure.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

I claim:

1. A venturi air ammonia mixer enabled for a double adiabatic oxidation burners system, comprising:

a venturi body comprising a convergent section (204*a*), a cylindrical section (204*b*), and a divergent section (204*c*), the cylindrical section (204*b*) being connected to the convergent section (204*a*) and the divergent section (204*c*);

wherein the convergent section (204*a*) comprises an air inlet feed (208) adapted to supply dry air to the cylindrical section (204*b*);

wherein the cylindrical section (204*b*) is enclosed within an annular region (212) connected to an ammonia inlet feed (206), wherein the ammonia inlet feed (206) is adapted to fill the annular region (212) with dry ammonia gas, wherein the cylindrical section (204*b*) further comprises an inner hollow member (202) having one end connected to the annular region (212) and positioned opposite to the ammonia inlet feed (206), wherein the cylindrical section 204(*b*) and the inner hollow member (202) is provisioned with a first perforated region (402*a*) and a second perforated region (402*b*), respectively, on the lateral circumference thereof in a manner such that the dry ammonia gas filled within the annular region (212) is adapted to enter the cylindrical section (204*b*) through the first perforated region (402*a*) and the second perforated region (402*b*) in order to facilitate uniform mixing of the dry ammonia gas with air to form air-ammonia mixture; and wherein the divergent section (204*c*) comprises an outlet (210) configured to transmit the air-ammonia mixture to the double adiabatic oxidation burners (124A and 124B).

2. The venturi air-ammonia mixer as claimed in claim 1, wherein the diameter of the air inlet feed (208) is within a predefined range between 250-600 mm (9.8-23.6 inches), and wherein the diameter of the ammonia inlet feed (206) is within a predefined range between 120-180 mm (4.7-7.1 inches).

3. The venturi air-ammonia mixer as claimed in claim 1, wherein the end of the inner hollow member (202) connecting the annular region (212) is provisioned through a groove on the cylindrical section (204*b*), and wherein the other end of the inner hollow member (202) is blocked, and wherein the inner hollow member (202) is supported by a plurality of weld supports (302) within the cylindrical section (204*b*), and wherein the diameter of the cylindrical (204*b*) section is within a predefined range between 280-320 mm (11.0-12.6 inches), and wherein the diameter of the inner hollow member (202) is within a range between 64-96 mm (2.5-3.8 inches).

4. The venturi air-ammonia mixer as claimed in claim 1, wherein the first perforated region (402*a*) and the second perforated region (402*b*) comprises an array of holes enabling transmission of the dry ammonia gas inside the cylindrical section (204*b*) to enable uniform and desired mixing with air.

5. The venturi air-ammonia mixer as claimed in claim 4, wherein a pitch of the array of holes in the first perforated region is 24 mm (0.9 inches), and wherein the diameter of the each hole of the array of holes in the first perforated region (402*a*) is within a predefined range between 2-6 mm (0.08-0.2 inches), and wherein the length and area of the first perforated region is within a predefined range between 300-600 mm (11.8-23.6 inches) and 324-496 $mm^2$ (12.8-19.5 $inches^2$) respectively, and the area of the each hole in the first perforated region (402*a*) ranges between 10-30 $mm^2$ (0.4-1.2 $inches^2$).

6. The venturi air-ammonia mixer as claimed in claim 4, wherein a pitch of the array of holes in the second perforated region is 15 mm (0.6 inches), and wherein the diameter of the each hole of the array of holes in the second perforated region (402*b*) is within a pre-defined range between 2-6 mm (0.08-0.2 inches), wherein the length and the area of the second perforated region (402*b*) is within a predefined range between 300-600 mm (11.8-23.6 inches) and 86-130 $mm^2$ (3.4-5.1 $inches^2$) respectively, wherein the area of each hole in the second perforated region (402*b*) range between 10-30 $mm^2$ (0.4-1.2 $inches^2$).

7. The venturi air-ammonia mixer as claimed in claim 6, wherein the number of holes distributed circumferentially and lengthwise on the cylindrical section (204*b*) ranges between 32-48 and 16-24 respectively, and the number of holes distributed circumferentially and lengthwise on the inner hollow member (202) ranges between 13-20 and 26-40 respectively.

8. The venturi air-ammonia mixer as claimed in claim 7, wherein the total number of holes on the first perforated region (402*a*) ranges between 650-975, and the total number of holes on the first perforated region (402*a*) ranges between 443-665.

9. The venturi air-ammonia mixer as claimed in claim 8, wherein the ammonia gas flows through each hole of the first perforation region (402*a*) and the second perforation region (402*b*) at a velocity range 30-45 m/s (98.4-147.6 ft/s), and wherein the pressure drop during the flow of ammonia gas across each hole of the first perforation region (402*a*) and the second perforation region (402*b*) ranges between 332-500 Pa (0.05-0.07 $lb/in^2$).

10. The venturi air-ammonia mixer as claimed in claim 8, wherein the volumetric flow rate of ammonia through each hole of the first perforation region (402*a*) and the second perforated region (402*b*) in a range between 0.000215-0.000325 $Nm^3$/hour (0.000134-0.000202 SCFM-standard cubic feet per minute).

11. The venturi air ammonia mixer as claimed in claim 1, wherein the ammonia gas flows through the ammonia inlet feed (206) to the annular region (212) at a velocity range between 16-25 m/s (52.5-82.0 ft/s), and wherein the ammonia gas further flows through the annular region (212) to the cylindrical section (204*b*) at a velocity range between 25-35 m/s (82.0-114.8 ft/s).

* * * * *